United States Patent [19]

Heitmann et al.

[11] Patent Number: 4,594,160

[45] Date of Patent: Jun. 10, 1986

[54] MAGNETIZABLE SEPARATOR FOR THE PURIFICATION OF LIQUIDS

[75] Inventors: Hans-Günter Heitmann, Erlangen; Günter Rupp, Marloffstein-Rathsberg, both of Fed. Rep. of Germany

[73] Assignee: Kraftwerk Union Aktiengesellschaft, Müheim, Fed. Rep. of Germany

[21] Appl. No.: 706,235

[22] Filed: Feb. 27, 1985

Related U.S. Application Data

[63] Continuation of Ser. No. 521,704, Aug. 9, 1983, abandoned.

[30] Foreign Application Priority Data

Aug. 11, 1982 [DE] Fed. Rep. of Germany ....... 3229927

[51] Int. Cl.[4] ............................................. B01D 35/06

[52] U.S. Cl. ...................................... 210/222; 60/657; 122/379; 122/451 R; 210/251; 210/411; 210/446

[58] Field of Search ............... 210/222, 223, 695, 446, 210/450, 251, 411; 55/3, 100; 122/459, 460, 379, 451; 60/646, 657

[56] References Cited

U.S. PATENT DOCUMENTS

| | | | |
|---|---|---|---|
| 2,430,157 | 11/1947 | Byrd, Jr. | 210/222 |
| 2,943,739 | 7/1960 | Maynard | 210/446 |
| 3,004,671 | 10/1961 | Sugalski et al. | 210/446 |
| 3,539,509 | 11/1970 | Heitmann et al. | 210/222 |
| 3,869,390 | 3/1975 | Heitmann et al. | 210/222 |
| 3,894,391 | 7/1975 | Heitmann et al. | 210/223 |
| 4,043,864 | 8/1977 | Heitmann | 210/222 |
| 4,249,994 | 2/1981 | Dolle | 210/222 |
| 4,505,824 | 3/1985 | Akamine et al. | 60/657 |

FOREIGN PATENT DOCUMENTS

| | | | |
|---|---|---|---|
| 67072 | 6/1977 | Japan | 210/222 |
| 154873 | 12/1979 | Japan | 210/222 |
| 149615 | 11/1980 | Japan | 210/222 |
| 1578396 | 11/1980 | United Kingdom . | |

*Primary Examiner*—Richard V. Fisher
*Assistant Examiner*—W. Gary Jones
*Attorney, Agent, or Firm*—Herbert L. Lerner; Laurence A. Greenberg

[57] ABSTRACT

Magnetic separator for the purification of liquids with a tube which conducts the latter, contains balls or wire screens as magnetizable bodies and is surrounded by a coil for magnetizing the bodies. The tube contains, in the flow direction of the liquids over the major part of its length, balls and subsequently wire screens. A common coil is associated with the balls and the wire screens for magnetizing. The balls and the wire screens are connected to a common flushing line.

3 Claims, 3 Drawing Figures

MAGNETIZABLE SEPARATOR FOR THE PURIFICATION OF LIQUIDS

This application is a continuation of application Ser. No. 521,704, filed Aug. 9, 1983, now abandoned.

BACKGROUND OF THE INVENTION

1. Field of the Invention

The invention relates to a magnetic separator for the purification of liquids with a tube conducting the latter, which contains balls or wire screens as magnetizable bodies and is surrounded by a coil for magnetizing the bodies.

2. Description of the Prior Art

The known separators have as the magnetizable bodies either steel balls, as shown for instance in German Pat. No. 1 277 488 and corresponding U.S. Pat. No. 3,539,509, or wire screens as described in German Published Non-Prosecuted Application DE-OS 26 28 095 and corresponding British Pat. No. 15 78 396, because the substances to be retained in the purification are almost of different nature, although the fields of application of the known separators may be similar with respect to the medium to be purified, namely, particularly feed-water in steam power generating plants. In any event, the known separators have not been used together heretofore in practice.

SUMMARY OF THE INVENTION

An object of the invention is to improve magnetic separators to achieve increased separation of overall impurities, without losing in operation the ruggedness which is known and proven in ball filters. In this connection it will be noted that separators with wire screens which are to be used for separating suspended paramagnetic substances of the finest structure, may be mechanically sensitive because wire diameters of a few hundredths of a millimeter are used.

With the foregoing and other objects in view, there is provided in accordance with the invention a magnetic separator for the purification of liquid having suspended therein magnetizable particles, which comprises a tube for flow therethrough of said liquid, magnetizable balls contained in the tube in the flow direction of the liquid over the major part of the tube length, magnetizable wire screens contained in the tube following said balls over a minor part of the tube length, a common coil for magnetizing both the balls and the wire screens surrounding the tube, and a common flushing line connected to the tube for flushing both the wire screens and the balls in the same flushing operation.

Other features which are considered as characteristic for the invention are set forth in the appended claims.

Although the invention is illustrated and described herein as embodied in a magnetizable separator for the purification of liquids, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

According to the invention, the separator mentioned at the outset has the features that the tube contains, in the flow direction of the liquid, balls over the major part of its length and subsequently, wire screens; that a common coil for magnetizing is associated with the balls and the wire screens; and that the balls and wire screens are connected to a common flushing line.

The separator according to the invention differs from a "series connection" of the known separating devices by a simpler design and the essential pre-purification which the ball filter exerts before the wire screen filter becomes active. Thereby the wire screen filters are prevented from becoming clogged or even destroyed by coarser particles. On the other hand, a relatively small effort for magnetically exciting the ball filter is sufficient because the deposition of small particles, which depends on the field strength, takes place in the following wire screen filter, where the magnetic flux aimed at the balls provides the desired large gradient at the thin wires. Overall, the device according to the invention therefore offers, with simple design, substantially higher separation rates and nevertheless the same operating reliability as the proven ball filters.

The diameters of the wires are preferably several hundredths to several thousandths of the ball diameters. The mesh width of the wire screens should be at least in the range of two-times the wire diameter. The same material, especially ferritic material, for instance, chromium-alloyed steel can advantageously be used for both the balls and the wire screens.

The wire screens can advantageously be protected by arranging them in a separately detachable insert, which extends into the tube from the side facing away from the balls. This also makes possible easy replacement, which may be desirable in view of special cleaning or heavier material wear of the fine wire screens. With the tube extending vertically, the insert is advantageously flanged to the lower end. Therefore, the normal flushing flow can be from the bottom up, so that in flushing, the balls of the ball filter are whirled up.

The new separator is particularly well suited for purifying condensates and feedwater in steam power generating plants. It can advantageously be arranged between the turbine condenser and the steam generator, and specifically preferably between the low-pressure preheater and the feedwater tank.

Figure 1:
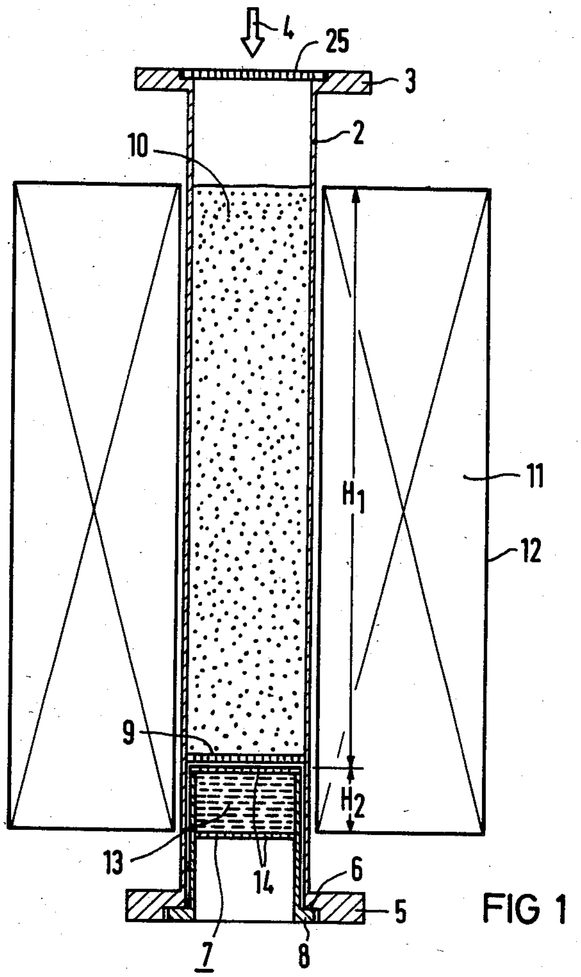
FIG. 1 illustrates in partial section the magnetic separator having a vertical tube through which the liquid to be purified flows downward. The top part of the tube is filled with magnetizable balls along a major portion of the tube length. Immediately beneath the balls is an insert in the tube containing magnetizable wire screens. A coil and a jacket surrounds the tube and the contained balls and wire screen.
Figure 2:
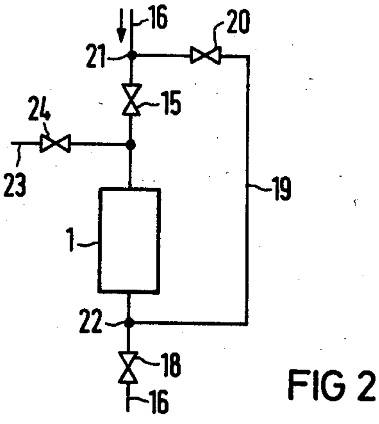
FIG. 2 diagrammatically shows the installation of the magnetic separator in a steam power generating plant, including piping for reverse flushing of both the wire screens and balls in one operation.

To explain the invention in greater detail, an embodiment example will be described, making reference to the attached drawing, where FIG. 1 shows a simplified vertical section through a separator according to the invention. FIG. 2 is a piping diagram which shows the installation of the separator in a steam power generating plant, not shown in detail.

The separator 1 comprises a cylindrical, vertically arranged tube 2 of nonmagnetic material, preferably austenite. The tube 2 has at its top side a flange 3 or a welding stub, where a line, not shown, for feeding in the condensate to be purified is connected. The feed enters the tube 2 in the direction of the arrow 4. At the lower end, a flange 5 or a stub permits the connection of a discharge line.

In the flange 5, a step 6 is created by a lathe cut of rectangular cross section. There, a cylindrical insert 7 is secured, which engages the step 6 with a flange 8 and protrudes upward into the tube 2 up to a screen sheet 9.

Above the screen sheet 9, the tube 2 is filled over a height $H_1$ of about 1000 mm with balls 10 of magnetizable material, for instance, a chromium-alloyed steel. The balls have, as a rule, a diameter of about 6 mm. They are piled loosely, so that an irregular arrangement is obtained. However, the invention can also be realized with matched ball and tube dimensions, with regular layer-wise arrangements of the balls.

The tube 2 is surrounded over the height $H_1$ and a further region $H_2$ by a cylindrical coil 11 which has an iron jacket 12 for shielding the magnetic field. The coil 11 is operated with d-c current so that a magnetic field strength of at least $1.5\times10^5$ A/M is present.

The magnetic excitation also covers the wire screens 13 which are stacked on top of each other in the interior of the insert 7 over the height $H_2$ and are arranged between perforated plates 14 of the insert 7 either closely or spaced by thin spacer plates. The wire screens 13 have a wire diameter of, for instance, 0.1 mm and a mesh width of, for instance, 0.2. mm. The mesh width and the wire thickness may also decrease in the direction of the flow indicated by the arrow 4, for instance, to one-half.

Feedwater of thermal power generating stations, for instance, nuclear power stations, is purified in a secondary or main flow with the separator 1. The feedwater has a temperature of, for instance 110° to 170° C. if the separator 1 is arranged, according to the invention, between the low-pressure preheaters and the feedwater tank. First, ferromagnetic impurities, especially magnetite, are separated in the region of the balls 10. In addition, coarser non-magnetic oxides are filtered out there mechanically, so that 70 to 90% of the contamination, depending on the oxide composition, are removed from the feedwater. Subsequently, finer, especially paramagnetic suspended substances such as $\alpha$-$Fe_2O_3$ are deposited on the wire screens 13 so that more than 95% of the solids contained in the feedwater are eliminated. The total flow loss, i.e., pressure drop, is only 2 bar, and more specifically, about 1 bar in the region of the balls 10 over the height $H_1$ and 1 bar over the height $H_2$ in the region of the wire screens 13.

FIG. 2 shows the separator 1 inserted into the feedwater circuit 16 via a shut-off valve 15. A second shut-off valve 18 is installed at the outlet from the separator 1. A flushing line 19 runs parallel to the separator. It leads with a valve 20 from a branching point 21 located upstream of the valve 15 to a connecting point 22 between the separator 1 and the valve 18. A drain line 23 with a shut-off valve 24 is provided between the valve 15 and the separator 1.

The feedwater flowing through line 16 at branching point 21 may be employed for flushing the separator 1. After the valves 15 and 18 are closed, the feedwater is conducted during and/or after demagnetization with decreasing a-c current via the open valve 20 and the line 19 to the lower end of the separator 1. The feedwater used for flushing thus flows from connecting point 22 through the separator 1 from the bottom up, thus first cleaning the wire screens 13. The balls 10, through which the water flows next, are whirled-up during the flushing process up to a screen sheet 25 inserted into the flange 3. The mechanical motion facilitates the separation of the deposited impurities from the balls. The impurities are then removed from the system through the valve 24 and the line 23.

Figure 3:
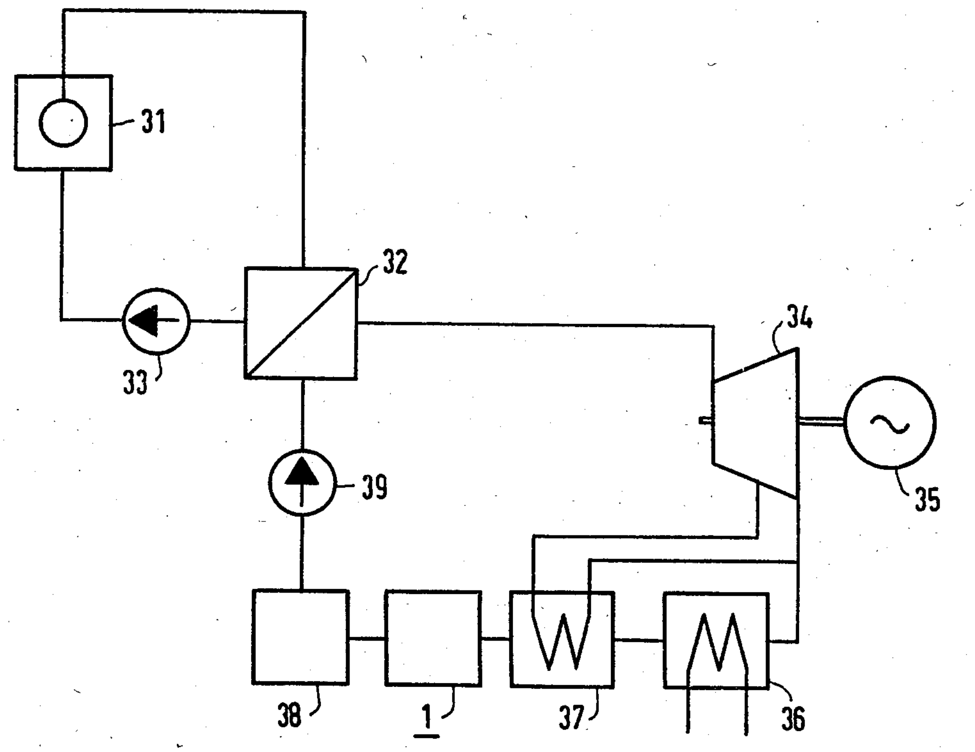
FIG. 3 diagrammatically illustrates a steam generator, steam turbine, turbine condenser, low-pressure preheater, and feed water tank with the magnetic separator interposed between the low-pressure preheater and the feed water tank.

Referring to FIG. 3, a pressurized water reactor 31 gives off its heat to a steam turbine 34 via a steam generator 32 through which a flow is generated by means of a pump 33. The turbine drives a generator 35. The turbine is followed by a turbine condenser 36. The condensate coming from the latter is preheated in a low-pressure preheater 37 which is heated by steam tapped from the turbine 34. The magnetic separator 1 is arranged after the turbine condenser 36 between low pressure preheater 37 and a feedwater tank 38, from which the feed water is transported into the steam generator 32 by means of a feedwater pump 39.

We claim:

1. Magnetic separator for the purification of liquid having suspended therein magnetizable particles which comprises (a) a vertical tube for flow downwardly therethrough of said liquid, (b) magnetizable balls contained in the tube in a flow direction of the liquid over a major part of the tube length, (c) a plurality of magnetizable wire screens stacked on top of each other contained in the tube following said balls over a minor part of the tube length, (d) said wire screens having wire thicknesses of several hundredth to several thousandths of the ball diameters, (e) said wire screens arranged in a separately detachable insert which protrudes into the tube from a downstream end facing away from the balls, said insert having an outward extending flange on the end of the insert opposite the other end which protrudes into the tube, (f) a common coil for magnetizing both the balls and the wire screens surrounding the tube portion which encloses both the balls and the wire screens, and (g) a common flushing line connected to the downstream end of the tube for flushing both the wire screens and the balls in the same flushing operation by reverse flushing by flowing a flushing liquid through the magnetic separator from the bottom up, first cleaning the wire screens then whirling-up the balls to loosen impurities thereon and suspend the impurities in the flushing liquid, and discharging the flushing liquid containing suspended solids from the top of the tube.

2. Magnetic separator according to claim 1, wherein the magnetic separator is disposed between a turbine condenser and a steam generator in thermal generating stations to purify condensate flowing from the turbine condenser to the steam generator.

3. Magnetic separator according to claim 2, wherein the magnetic separator is disposed between a low-pressure preheater and a feedwater tank to treat liquid flowing therebetween.

* * * * *